United States Patent
Lopez Taboada et al.

(10) Patent No.: US 8,839,267 B2
(45) Date of Patent: Sep. 16, 2014

(54) METHOD AND MIDDLEWARE FOR EFFICIENT MESSAGING ON CLUSTERS OF MULTI-CORE PROCESSORS

(75) Inventors: Guillermo Lopez Taboada, Coruna (ES); Juan Tourino Dominguez, Coruna (ES); Ramon Doallo Biempica, Coruna (ES)

(73) Assignee: Universidade da Coruna-Otri, A Coruna (ES)

( * ) Notice: Subject to any disclaimer, the term of this patent is extended or adjusted under 35 U.S.C. 154(b) by 187 days.

(21) Appl. No.: 13/400,199

(22) Filed: Feb. 20, 2012

(65) Prior Publication Data

US 2012/0216216 A1    Aug. 23, 2012

Related U.S. Application Data

(60) Provisional application No. 61/444,789, filed on Feb. 21, 2011.

(51) Int. Cl.
*G06F 13/00*    (2006.01)

(52) U.S. Cl.
USPC ............ 719/313; 719/314; 719/321; 719/330

(58) Field of Classification Search
CPC ......... G06F 9/4411; G06F 9/54; G06F 9/546; G06F 9/547
USPC ................................. 719/313, 314, 321, 330
See application file for complete search history.

(56) References Cited

U.S. PATENT DOCUMENTS

| | | | |
|---|---|---|---|
| 5,848,234 A * | 12/1998 | Chernick et al. | 709/203 |
| 2006/0129981 A1 | 6/2006 | Dostert et al. | |
| 2007/0011687 A1 | 1/2007 | Ilik et al. | |
| 2009/0043540 A1 | 2/2009 | Faraj | |
| 2009/0240797 A1 | 9/2009 | zu Bexten et al. | |
| 2010/0070650 A1 | 3/2010 | MacGaffey et al. | |
| 2010/0162271 A1 | 6/2010 | Arimilli et al. | |

OTHER PUBLICATIONS

Guillermo L. Taboada et al., Java Fast Sockets: Enabling high-speed Java communications on high performance clusters. Elsevier Computer Communications 31 (2008) 4049-4059.

Guillermo L. Taboada et al., F-MPJ: scalable Java message-passing communications on parallel systems. J Supercomput (2012) 60:117-140. Published online: Feb. 27, 2009.

Guillermo L. Taboada et al., Efficient Java Communication Libraries over InfiniBand. 2009 11th IEEE International Conference on High Performance Computing and Communications.

Mark Baker et al., A Buffering Layer to Support Derived Types and Proprietary Networks for Java HPC. Scalable Computing: Practice and Experience vol. 8, No. 4, pp. 343-358.

Aamir Shafi et al., Multicore-enabling the MPJ Express Messaging Library. PPPJ '10 Sep. 15-17, 2010, pp. 49-58.

(Continued)

*Primary Examiner* — Andy Ho
(74) *Attorney, Agent, or Firm* — Mateo Aboy; Aboy & Associates PC

(57) ABSTRACT

Disclosed embodiments include a Java messaging method for efficient inter-node and intra-node communications on computer systems with multi-core processors interconnected via high-speed network interconnections. According to one embodiment, the Java messaging method accesses the high-speed networks and memory more directly and reduces message buffering. Additionally, intra-node communications utilize shared memory transfers within the same Java Virtual Machine. The described Java messaging method does not compromise Java portability and is both user and application transparent.

17 Claims, 9 Drawing Sheets

(56) References Cited

OTHER PUBLICATIONS

Guillermo L. Taboada et al., Device level communication libraries for high-performance computing in Java. Concurrency and Computation: Practice and Experience 2011; 23:2382-2403. Published online Jun. 14, 2011.

Roberto R. Expósito et al., Design of scalable Java message-passing communications over InfiniBand. J Supercomput (2012) 61:141-165. Published online: Jul. 23, 2011.

Sabela Ramos et al., Scalable Java Communication Middleware for Hybrid Shared/DistributedMemory Architectures. 2011 IEEE International Conference on High Performance Computing and Communications.

* cited by examiner

METHOD AND MIDDLEWARE FOR EFFICIENT MESSAGING ON CLUSTERS OF MULTI-CORE PROCESSORS

CROSS-REFERENCE TO RELATED APPLICATIONS

This application claims the benefit of U.S. Provisional Application No. 61/444,789 filed on 2011 Feb. 21 by the present inventors, which is incorporated herein by reference.

TECHNICAL FIELD

Disclosed embodiments relate to messaging and communications. More particularly, they relate to efficient message transfers on clusters of computer systems with multi-core processors, interconnected via high-speed networks.

BACKGROUND

The exponential increase in the number of cores per computer cluster node demands more efficient and scalable communication mechanisms since they are the limiting factors for cluster performance. The adoption of high-speed networks, such as InfiniBand, Myrinet, and 1/10/40/100 Gigabit Ethernet, generally improves communication performance, but their support in Java is poor. The main reason for this is that all Java communications are based on TCP/UDP sockets, which do not support reliable delivery of messages, since TCP only supports reliable streaming, and UDP only supports unreliable streaming and messaging. The upcoming JDK 1.7 will improve this situation by incorporating Stream Control Transmission Protocol (SCTP) sockets and Sockets Direct Protocol (SDP) support, but neither solution is portable. In fact, SCTP sockets cannot be used on several platforms, and SDP is initially supported only in Solaris. Moreover, both solutions still provide poor performance since SCTP sockets rely on their native implementation that performs less effectively than TCP sockets, and SDP has a performance similar to Internet Protocol (IP) emulation on InfiniBand (IPoIB) that performs well below the capability of the communication hardware. Additionally, Java does not support an efficient mechanism for message delivery in shared memory systems. In fact, Java communications are strongly oriented to the efficient support of distributed WAN applications, to the detriment of Java communications performance on clusters with high-speed networks, which are widely employed in High Performance Computing (HPC), data processing centers, and cloud infrastructures.

High-speed networks are supported in standard Java Virtual Machines (JVM) using IP emulations. These emulation libraries provide high start-up latency (0-byte message latency), low bandwidth, and high CPU load. The main reason for this poor throughput is that the IP protocol was designed to cope with low speed, unreliable, and failure prone links in WAN environments, whereas current cluster networks in Local Area Network (LAN) and System Area Network (SAN) environments are high-speed, hardware reliable, and failure resistant. Examples of IP emulations are IP over Myrinet low-level libraries MX (Myrinet Express) and GM (IPoMX and IPoGM), LANE driver over Giganet, IP over InfiniBand (IPoIB), and ScaIP and SCIP on Scalable Coherent Interface (SCI).

In order to provide Java with fuller more efficient support on high-speed networks, several approaches have been followed: (1) Virtual Interface Architecture (VIA) based projects, (2) Remote Method Invocation (RMI) optimizations, (3) Java Distributed Shared Memory (DSM) middleware on clusters, (4) high performance Java sockets implementations, and (5) low-level libraries on high-speed networks.

Javia and Jaguar provide access to high-speed cluster interconnections through VIA, a communication library implemented on Giganet, Myrinet, Gigabit Ethernet and SCI, among others. More specifically, Javia reduces data copying using native buffers, and Jaguar acts as a replacement for the Java Native Interface (JNI). Their main drawbacks are the use of custom APIs, the need for modified Java compilers, and the lack of non-VIA communication support. Additionally, Javia exposes programmers to buffer management and uses a custom garbage collector.

Typical projects that deal with Remote Method Invocation (RMI) optimization are Manta, a Java to native code compiler with a fast RMI protocol, and KaRMI, which improves RMI through efficient object serialization that reduces protocol latency. Serialization is the process of transforming objects into a series of bytes, in this case to be sent across the network. However, the use of custom high-level solutions that incur substantial protocol overhead, and the focus on Myrinet, has restricted the applicability of these projects. In fact, their start-up latency is from several times to an order of magnitude greater than socket latencies.

Noteworthy Java DSM projects are Jackal, cJVM, CoJVM, JESSICA2, and JavaSplit. As these are socket-based projects, they benefit from socket optimizations, especially in shared memory communication. However, they share unsuitable characteristics, such as the use of modified JVMs, the need for source code modification, and limited interoperability. Additionally, they do not directly support high-speed networks. A related project is Pleiad, which provides shared memory abstraction on top of physically distributed resources. The programmer uses an API with special threads, shared arrays, and shared objects across a multi-core cluster. However, Pleiad does not support directly high-speed networks.

Java Fast Sockets (JFS) is an optimized Java socket implementation that: (1) more directly supports high-speed networks such as SCI, Myrinet, and Gigabit Ethernet; (2) alleviates the serialization overhead; (3) reduces buffering and unnecessary copies; and (4) re-implements the protocol for boosting shared memory (intra-node) communication by resorting to UNIX sockets. Another related project in high performance sockets implementations is Non-Blocking IO (NBIO), which introduced non-blocking features. These features were eventually standardized in Java New I/O (Java NIO) sockets, which are crucial for increased scalability in server applications. Nevertheless, neither NBIO nor NIO sockets provide high-speed network support. Ibis sockets library is a high performance sockets implementation over the Ibis Portability Layer (IPL), which can run on TCP or MX (Myrinet). However, this socket implementation does not significantly exploit MX direct support, and consequently only achieves a performance similar to TCP support on IPoMX.

Another approach for the support of high-speed networks in Java is the development of custom low-level Java libraries on a specific network. An example is Jdib, which accesses Mellanox Verbs Interface (VAPI) on InfiniBand through a low-level API that directly exploits Remote Direct Memory Access (RDMA) and communication queues. In this way, Jdib achieves almost native performance on InfiniBand, but the use of a low-level API makes the implementation of Java applications difficult, and compromises the efficiency of the solution due to the need for multiple accesses to VAPI native functions for each message transfer.

Other efforts to provide fuller and more efficient support for high-speed networks in Java have several drawbacks, such as the use of non-standard JVMs and Java compilers, the use of custom APIs, and the relatively small performance benefits due to the inefficiency of the communication mechanisms implemented.

In addition to poor Java support on high-speed networks, Java applications usually suffer from inefficient communication middleware that is substantially based on protocols with high communication overhead, such as sockets and especially Java RMI, whose protocol involves a significant number of socket transfers.

Initial implementations of Message-Passing in Java (MPJ) middleware, which are messaging systems oriented towards HPC, relied upon RMI for communications. However, for reasons of efficiency, they are now implemented either with sockets or with wrapped native Message Passing Interface (MPI) communication libraries. The most common socket-based implementations are MPJ Express, MPJ/Ibis and F-MPJ, and the most common wrapper implementation is mpiJava.

MPJ Express is a "pure" Java (100% Java) MPJ solution, implemented on top of Java NIO. MPJ Express is thread-safe and implements a pluggable architecture that combines the portability of "pure" Java NIO communications with high performance Myrinet support. The latter occurs through use of the native MX communication library. However, the use of several communication layers, such as MPJ, mpjdev, xdev and the buffering layer, adds significant overhead to MPJ Express communications.

MPJ/Ibis is another MPJ library. It has been implemented on top of Ibis, a parallel and distributed Java computing framework. Ibis can use either "pure" Java communications or native communications on Myrinet. There are two low-level communication devices in Ibis: TCPIbis, which is based on Java IO sockets (TCP), and NIOIbis, which provides both blocking and non-blocking communication through Java NIO sockets. However, MPJ/Ibis is not thread-safe, does not take advantage of non-blocking communication, and its Myrinet support is based on the GM library, which has lesser performance than the MX library.

F-MPJ is an MPJ library that outperforms MPJ Express and MPJ/Ibis. It does so by using Java Fast Sockets (JFS) and by implementing a communication protocol that provides efficient non-blocking communication, thereby allowing communication overlapping, and thus more scalable performance. Additionally, F-MPJ reduces the buffering overhead and implements efficient MPJ collective primitives.

The most relevant MPJ Java wrapper project is mpiJava, a library that uses native MPI implementations for communications. However, although mpiJava performance is usually high, this library currently only supports some native MPI implementations, since the wrapping of a wide number of functions and heterogeneous runtime environments entails a significant effort. Additionally, this implementation is not thread-safe, and therefore is unable to take advantage of multi-core systems through multithreading. Because of these drawbacks, the mpiJava project has been superseded by the development of MPJ Express.

Shared memory communication support in Java messaging systems is currently only implemented in MPJ Express within its "smpdev" multi-core communication device. This allows thread-based shared memory (intra-node) transfers. However, the performance benefits of this thread-based shared memory communication support are severely limited due to the use of: the MPJ Express buffering layer (mpjbuf), excessive synchronization overhead, and multiple processing layers.

Examples of other native (non-Java) messaging systems that support shared memory communications are MPICH2 (through its "shm" and "Nemesis" channels), TOMPI, and TMPI.

However, these systems are limited to intra-node communications and do not apply to clusters of multi-core processors.

Hybrid shared/distributed memory architectures increase the complexity of communication protocols, since they combine network (inter-node) communications with shared memory (intra-node) communications, thereby requiring efficient communication overlapping.

Existing systems that utilize hybrid shared/distributed memory architectures use a hybrid-programming paradigm of shared memory and Message-Passing libraries, such as OpenMP and MPI, in a hierarchical structure. In this structure, MPI is used for inter-node communications and OpenMP is used for parallel processing within each node. Although this approach might appear to fully exploit the available computer resources, it actually presents several problems, such as preventing compiler optimizations due to the use of threads, excessive synchronization overhead, and the need for thread safety in the Message-Passing library. In the MPI-2.0 standard, Section 8.7, the hybrid approximation replaces OpenMP by POSIX-threads (pthreads) in order to provide a higher degree of control and reduce the impact of the aforementioned issues. A hybrid paradigm approach, for use with Java, can also be followed. Thus, messaging libraries can be combined with Java threads and Java OpenMP-like libraries, such as JOMP and the shared memory API of the Parallel Java library. Nevertheless, all these projects require the use of two programming paradigms, which involves a significant programming effort. In large part this is due to the use of low-level threading models, which typically incurs a higher synchronization overhead than a single programming paradigm.

Current native messaging systems take advantage of hybrid shared/distributed memory architectures using only the messaging programming model when combining, transparently to the user, shared memory communication devices (intra-node) with network communication devices (inter-node). Examples of the transparent support of hybrid memory architectures in messaging systems are MPICH2 "sshm" (sockets plus "shm" shared memory support), Nemesis-IB (shared memory and InfiniBand support), and SHIBA (POSIX shared memory and InfiniBand support). Nevertheless, when supporting both shared and distributed memory communications (both intra-node and inter-node transfers), the shared memory communication is implemented as an inter-process transfer, not as a thread-based intra-process communication.

SUMMARY

Disclosed embodiments include a method for Java messaging implemented in a processing system with one or more processors and with one or more cores per processor, the method for Java messaging comprising transmitting an object from a sender method to a receiver method using a protocol based on a protocol substantially equivalent to a Java Fast Network Communication protocol.

Disclosed embodiments further include a method for Java messaging implemented in a processing system with one or more processors and with one or more cores per processor, the method for Java messaging comprising transmitting an object from a sender method to a receiver method using a protocol based on a protocol substantially equivalent to a Java Fast Shared-Memory Communication protocol.

Disclosed embodiments further include a method for Java messaging implemented in a processing system with one or more processors and with one or more cores per processor, the method for Java messaging comprising transmitting an object from a sender method to a receiver method based on a protocol substantially equivalent to a a Java Fast Hybrid Network/Shared-Memory protocol.

According to one embodiment, an apparatus for Java messaging comprising a processor configured to execute a method for Java messaging is disclosed. According to this particular embodiment, and without limitations, the method comprises transmitting an object from a sender method to a receiver method using a protocol wherein the sender method is invoked by passing an identifier of the object and an identifier of a transmission endpoint as arguments into the sender method and wherein the protocol 1) implements lightweight object marshaling with neither serialization nor deserialization of object data that is contiguous in Java memory, 2) copies the object to a message queue, whereby synchronization overhead between the sender and the receiver methods is avoided, 3) implements direct access to the object by native high-speed network drivers and shared-memory, whereby the use and overhead of a TCP/IP protocol stack is avoided, and 4) transmits the object via one or more cluster interconnection networks using one or more high-speed network switches.

BRIEF DESCRIPTION OF THE DRAWINGS

Disclosed embodiments are illustrated by way of example, and not by way of limitation, in the figures of the accompanying drawings.

DETAILED DESCRIPTION

Figure 1:
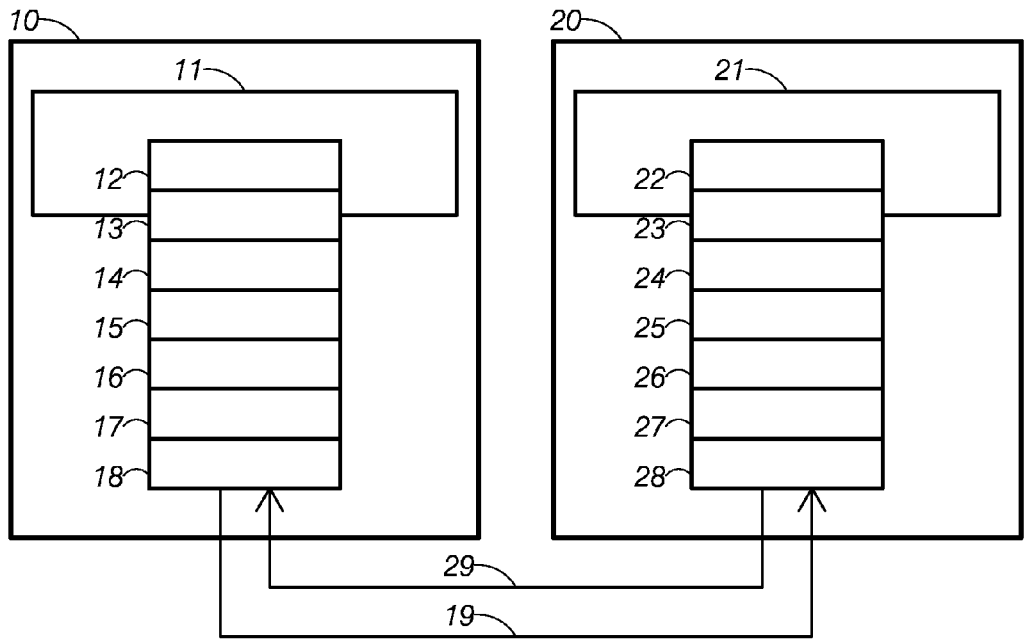
FIG. 1 illustrates a block diagram representing an existing method for transferring messages between two processes running in two different computer systems interconnected via a network.

Java represents an attractive choice for development of communication middleware for hybrid shared/distributed memory architectures, as it is a multithreaded language and can utilize any of the available Java network communication middleware. Thus, Java can take full advantage of hybrid architectures using thread-based intra-process communication in shared memory, as well as efficient inter-node communication.

In Java communications, the primary sources of inefficiency are related to the need for inter-process communication mechanisms. These mechanisms deliver the content of a message, which is sent from a transmitting process in a first address space, to a temporary buffer that is then copied by the receiving process into a second address space. These mechanisms involve a significant overhead in Java due to: (1) extra data copying; (2) use of communication protocols with low performance (e.g., sockets); (3) transitioning execution through JNI, from user mode within the JVM to kernel mode within the underlying operating system; and (4) overhead associated with the messaging protocol itself, caused by costly operations such as queuing and de-queuing of messages. The need for extra data copying incurs a significant performance penalty in terms of both CPU load and poor exploitation of the data locality and memory hierarchy (i.e., cache access optimization).

As is evidenced from the foregoing discussion, existing Java messaging systems compatible with clusters of computer systems with multi-core processors interconnected via high-speed networks are highly inefficient because: (1) they resort to IP-based streaming socket-based protocols, (2) they do not exploit thread-based intra-node message transfers, (3) the implemented communication mechanisms do not reduce the buffering and serialization overhead, and (4) they poorly exploit the data locality and memory hierarchy.

In order to provide an efficient mechanism for Java message transfers on clusters of computer systems with multi-core processors interconnected by high-speed networks, several approaches from native (non-Java) messaging middleware can be implemented. However, these approaches must be modulated by the particular characteristics of Java platform communications. The most efficient approach involves the creation of the new messaging method described herein according to particular embodiments, and without limitation.

According to one embodiment, a Java messaging method implements a "Java Fast Communication Protocol" in order to speed up communications and provide "Lightweight Object Marshaling." The Java Fast Communication protocol includes a Java Fast Network Communication protocol, a Java Fast Shared-Memory Communication protocol, and a Java Fast Hybrid Network/Shared-Memory protocol. The Java Fast Communication protocol more directly accesses the underlying hardware resources, both high-speed networks and memory, and reduces message buffering. Additionally, when both sender and receiver peers are in the same node then a shared memory transfer can be performed within the same JVM. The proposed Java messaging method is implemented within Java communication libraries, and therefore is user and application transparent. The proposed Java messaging method does not compromise Java portability, and thus enables easy integration with Java applications. In fact, communication methods, sender and receiver, only need an identifier of the transmitting object and an identifier of a transmission endpoint as arguments, thus improving usability and programmability of this method. Lightweight Object Marshaling comprises the determination of the availability of the Java Fast Communication protocol, and, if available, the determination of the need for serialization/deserialization, and if not needed, the access in the sender method to the data of the object to be transferred, passing the reference or references of the location of the data to the Java Fast Communication protocol, and the ascertainment in the receiver method of the address of the destination of the received data. In case serialization/deserialization is required, the message in the serialized form can still be transmitted using the Java Fast Communication protocol.

Certain specific details are set forth in the following description and figures to provide a thorough understanding of various embodiments disclosed. Certain well-known details often associated with computing and software technology are not set forth in the following disclosure to avoid unnecessarily obscuring the various disclosed embodiments. Further, those of ordinary skill in the relevant art will understand that they can practice other embodiments without one or more of the details described below. Aspects of the disclosed embodiments may be implemented in the general context of computer-executable instructions, such as program modules, being executed by a computer, computer server, or device containing a processor. Generally, program modules include routines, programs, objects, components, data structures, etc., that perform particular tasks or implement particular abstract data types. Aspects of the disclosed embodiments may also be practiced in distributed computing environments where tasks are performed by remote processing devices that are linked through a communications network. In a distributed computing environment, program modules may be located in both local and remote storage media including memory storage devices. Those skilled in the art will appreciate that given the description of the modules comprising the disclosed embodiments provided in this specification, it is a routine matter to provide working systems that work on a variety of known and commonly available technologies capable of incorporating the features described herein.

According to one embodiment of the present disclosure, and without limitation, the proposed method implements a "Java Fast Network Communication Protocol," which comprises: (1) receiving the references to the data to be transferred; (2) determining the actions required prior to the communication, based on the contiguity of the data, the need for serialization, and the available communication mechanisms; (3) invocating a communication send operation provided by high-speed network drivers; and (4) innovating a communication receive operation with the references to the address of the destination of the received data. Thus, this protocol provides efficient communication on distributed memory systems by allowing Java applications to directly access the high-speed network interface card (NIC), thereby avoiding use of the TCP/IP stack. According to one embodiment, direct access to the high-speed NIC is implemented using high-speed network drivers, namely Open-MX on Ethernet networks (1/10/40/100 Gigabit Ethernet) and shared memory, the communication protocol stack Open Fabrics Enterprise Distribution (OFED), InfiniBand Verbs (IBV) on InfiniBand, MX (Myrinet Express) on Myrinet, or even using MPI and user Direct Access Programming Library (uDAPL) on a variety of interconnection technologies. uDAPL being a user-level API for programming RDMA-capable transports. These network drivers communicate through messages, rather than streams, so that implementation of a Java messaging library on top of them does not require conversion of messages to data streams, and vice versa. Moreover, the high-speed NIC is able to directly access contiguous Java memory regions in order to transfer these regions directly through the high-speed network; this occurs without buffering, intermediate data copying, or even serialization in the case where both sender and receiver systems have the same endianness. Portability is not compromised due to compatibility of the aforementioned network drivers with a plurality of interconnection technologies, including dynamic linking of system libraries and error handling. Consequently, transparent detection at runtime of the supported interconnection technology is achieved. This embodiment of the present disclosure is best suited to distributed memory architectures requiring inter-node communications.

According to one embodiment of the present disclosure, and without limitation, the proposed method implements a "Java Fast Shared-Memory Communication Protocol," which comprises: (1) receiving the references to the data to be transferred; (2) determining the actions required prior to the communication, based on the contiguity of the data; and (3) copying of the data from its source address(es) to the destination address(es). Thus, this protocol provides efficient communication on shared memory systems, where several applications can run concurrently in separate different threads, within a single JVM. Each application is loaded by a custom class-loader in order to preserve its naming space, thus isolating the naming space but sharing the address space. In this way, all threads have access to the shared memory communication device, which handles the communication operations. In this embodiment, the communication device performs message communication by direct data transfer (Local Direct Memory Access) of the source message (object) to the destination memory region. This embodiment of the present disclosure is best suited to shared memory architectures requiring intra-node communications.

According to one embodiment of the present disclosure, and without limitation, the proposed method implements a "Java Fast Hybrid Network/Shared-Memory Protocol," which comprises: (1) receiving the references to the data to be transferred; (2) determining the actions required prior to the communication, based on the communication endpoint, the contiguity of the data, the need for serialization, and the available communication mechanisms; (3) invocating a communication send operation or a shared memory data copy; and (4) invocating a communication receive operation or access to a shared memory address through the references to the address of the destination of the received data. Thus, this protocol provides efficient communication on both shared or distributed memory architectures (hybrid shared/distributed memory architectures) by utilizing both high-speed network communication devices and shared memory communication support. This hybrid approach is transparent to the user/application; however, the Java messaging method is able to take full advantage of any particular system architecture by optimizing communication patterns based on the underlying hardware configuration. The message transfer involves the sending process generating a call to the communication device, which automatically selects at runtime the most efficient communication mechanism, either direct-data transfer on a shared memory system or direct access to the NIC driver on a distributed memory system. Moreover, the proposed method can manage combinations of communication protocols, such as supporting several network protocols simultaneously.

According to one embodiment of the present disclosure, and without limitation, the proposed method is able to reduce the number of message copies necessary in order to transfer a message from a sending method to a receiving method, in either shared or distributed memory architectures.

According to one embodiment of the proposed method, and without limitation, communication operations support non-blocking data transfers using message queues for new and retrieved messages. This support does not incur costly operations in either the JVM or the operating system kernel. This feature is useful in scenarios with a high message transfer rate in a high-speed cluster, with multiple processing cores communicating per node, where non-blocking operations can simultaneously handle the message queues.

An example of an existing method for transferring messages via a network between two Java processes running on two different computer systems is shown in FIG. 1. The sending process 12 is running on a computer system 10, within a Java Virtual Machine (JVM) 11, and uses a messaging API for invoking the communication method within the communication device 13. The existing system's communication device 13 serializes the Java objects to be transferred, and then stores the result of the serialization in a communication buffer. Java communication libraries (e.g., RMI, JMS, and Message-Passing in Java) rely on a socket implementation 14 for data transfers. Socket implementations rely on a transport protocol 15, such as TCP, UDP, or SCTP. The transport protocols rely on the IP network protocol 16, which transfers data through the network driver 17 and the NIC 18. Data is transferred through the physical network layer 19 to the receiving process running within the remote JVM 21 of the remote computer 20. The message traverses the NIC 28, the high-speed network driver 27, the IP network layer 26, the transport protocol 25, the sockets library 24, the communication device 23, and eventually arrives at the receiving method 22 by way of the messaging API. The whole process involves at least fifteen steps for a direct transfer. In addition, according to the communication library being used, there may be additional steps if the receiving side must ACK or send control messages back to the sending process through the physical network layer 29.

Although some optimizations have been proposed for existing Java messaging methods, e.g., the use of high-speed cluster interconnections or the use of high performance sockets implementations as proposed by G. L. Taboada, J. Tourino, R. Doallo, "Java Fast Sockets: Enabling High-speed Java Communications on High Performance Clusters", Computer Communications, Vol. 31, No. 17, pp. 4049-4059, 2008, the communication process presents similar behavior. In fact, the support of high-speed cluster interconnections in Java is based on the use of IP emulations, a network layer on top of the high-speed network drivers that enables the use of standard transport protocols, such as TCP/UDP, on Java. Moreover, Java communication libraries continue to use sockets, which necessitate the handling of messages as streams. Although the use of high performance socket implementations, such as Java Fast Sockets, alleviates the communication overhead, it does not prevent data serialization and buffering when using standard Java communication libraries.

Figure 2:
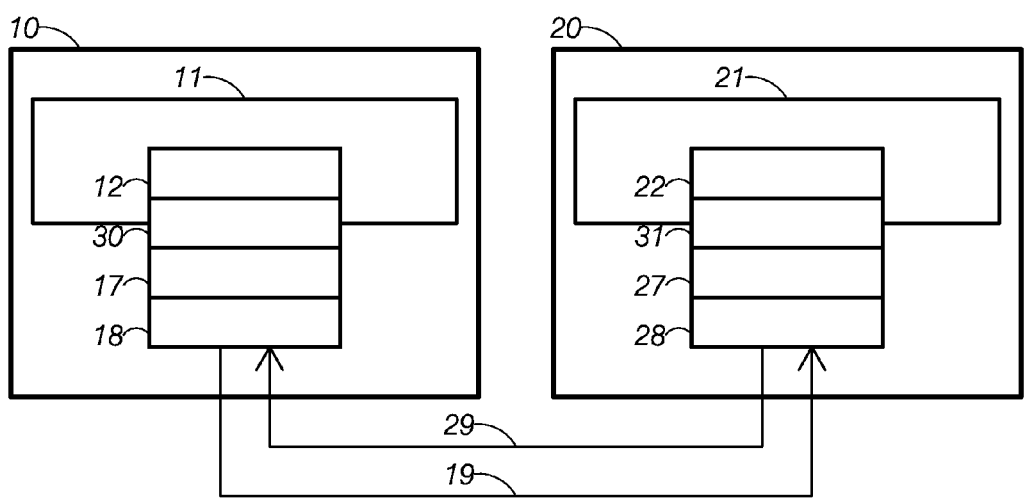
FIG. 2 illustrates a block diagram representing an embodiment of the present disclosure for transferring messages between two processes via a network interconnection.

According to one embodiment of the present disclosure, and without limitation, the proposed method for transferring messages between two processes through a network interconnection is shown in FIG. 2. This method implements the Java Fast Network Communication protocol. The sending process 12 is running on a computer system 10, within a standard JVM 11, and uses a messaging API for invoking the communication method within the communication device 13. Efficient Java communication support is obtained through the communication device 30, which implements the communication mechanism of the present disclosure. This mechanism more directly accesses the NIC 18 and underlying high-speed networks 19, such as InfiniBand, Myrinet and 1/10/40/100 Gigabit Ethernet, through the network driver 17, namely InfiniBand Verbs (IBV), Myrinet Express (MX), and OpenMX respectively (or even using MPI and uDAPL, user Data Access Programming Language, on a variety of interconnection technologies). The communication device 30 supports Java messaging APIs that allow at a minimum, point-to-point communication of objects to a particular process. The process is identified by an identity object, and the message, which comprises the object(s) being transmitted, is identified by a unique tag label. The supported Java messaging APIs may also support message broadcast and multicast, among other collective operations (e.g., gather, scatter and reduce data). Since the supported APIs are independent of the underlying network technology, the described system does not compromise Java portability and is user/application transparent when a standard Java API is implemented, such as RMI or JVM. Nevertheless, this implementation requires that the underlying network technology support message transfers (distinct from data streaming).

According to the embodiment of the present disclosure shown in FIG. 2, and without limitation, the support of Java on a particular network technology is implemented using Java Native Interface (JNI), which directly accesses the communication driver of the underlying interconnection technology (e.g., high-speed networks). JNI can directly access and transfer an object's contiguous regions of memory. Access to Java memory depends on the type of memory, heap or non-garbage collected permanent memory. The memory access is transparent, and is performed without affecting the operation of the garbage collector, without copying the memory region to a temporary buffer, and without blocking the communication method. Therefore, JNI functions such as Get/ReleasePrimitiveArrayCritical can be used. The Java communication device 30 either relies on point-to-point data transfers provided by the network driver 17, such as MX or Open-MX, or implements point-to-point communications using the network communication mechanisms available in the network layer 17, such as Remote Direct Memory Access (RDMA) in InfiniBand. Support for RDMA has been included in the Java communication device 30, but not in upper layers, such as the Java messaging APIs. Point-to-point operations are implemented in native code, so the JVM need only invoke one native communication method. Moreover, the API implemented in InfiniBand is similar to MX, thus supporting the Java implementation of the communication device 30. The remaining steps in the communication process are: data transfer through the physical network layer 19, and on the receiving side, the receiving process 22 running within the remote JVM 21 on the remote computer 20. The message traverses the NIC 28, the high-speed network driver 27, the communication device 31, and eventually arrives at the receiving process 22 by way of a messaging reception method call. If the communication protocol implemented in the Java communication device 30 requires a signal (ACK or control message) from the peer Java communication device 31, a network transfer from the receiving communication device 31 goes back to the sending communication device 30 through the physical network layer 29.

Figure 3:
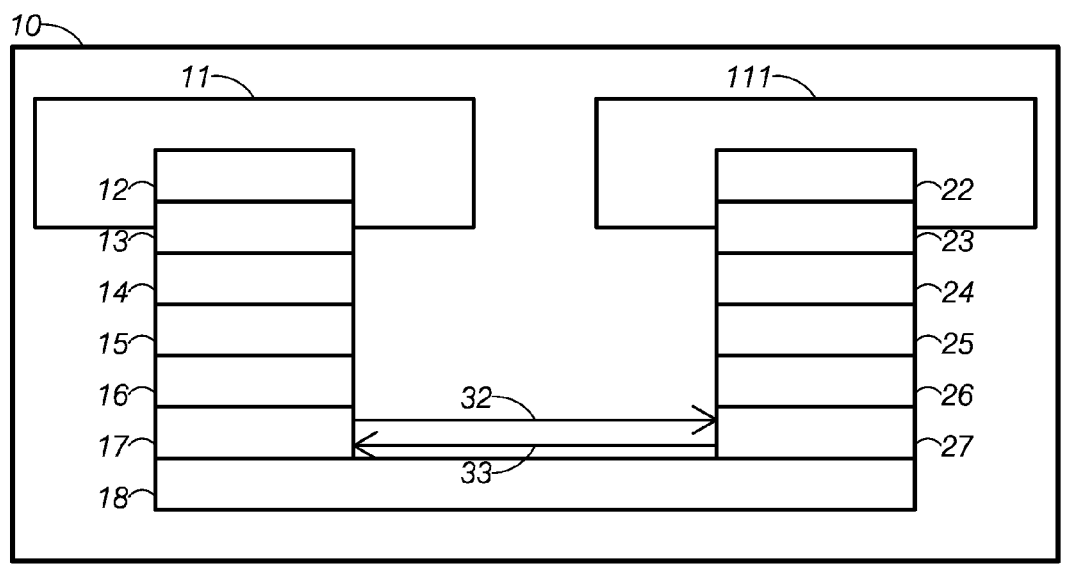
FIG. 3 illustrates a block diagram representing an existing method for transferring messages between two processes running on the same computer system.

An example of an existing method for transferring messages between two Java applications running on the same computer system is shown in FIG. 3. The sending process 12 is running within a JVM 11 on a computer system 10, and uses a messaging API for invoking the communication method within the communication device 13. The communication process in this scenario is similar to the existing communication mechanism shown in FIG. 1, except that the message does not reach the NIC 18, which is bypassed at the network technology driver 17. At this level the message is captured by the loopback logical device interface 32, and then traverses the communication stack in reverse order, eventually arriving at the receiving method 22, which runs on a different JVM 21 within the same computer system 10. If the communication protocol requires a control message to be sent back, then it is sent from the receiving method to the sending method traversing the loopback or shared memory interface 33. Nevertheless, in Java, the use of multiple JVMs per computer system represents a significant memory waste.

Figure 4:
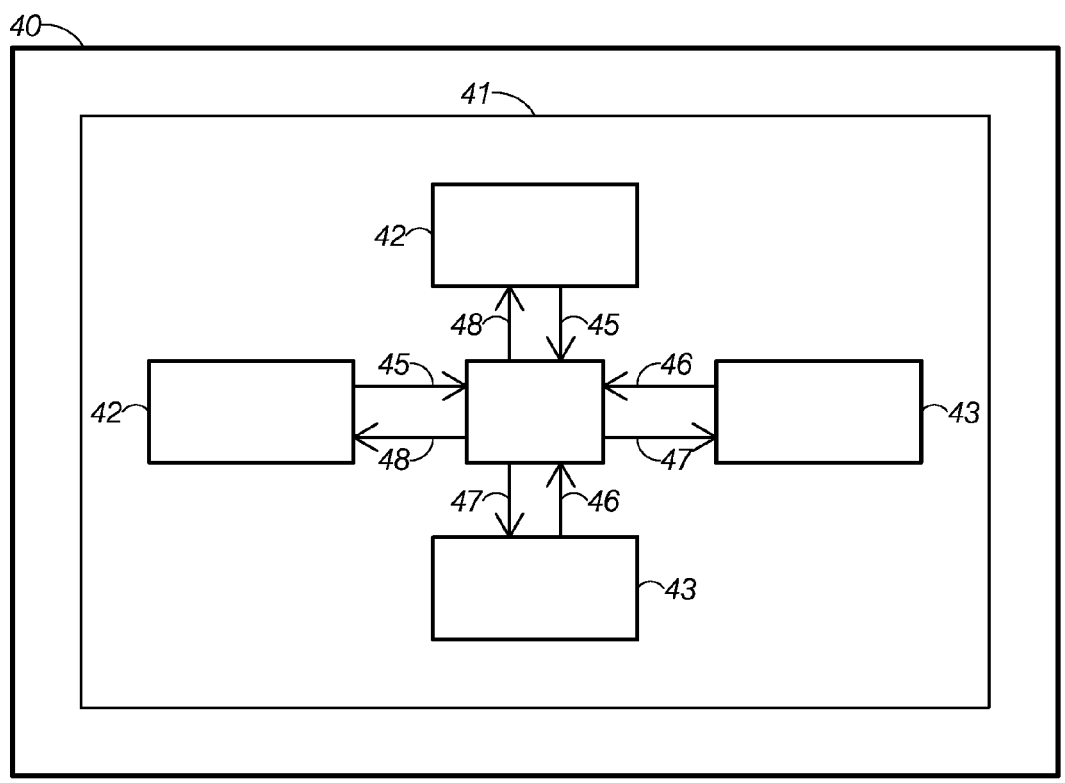
FIG. 4 illustrates a block diagram representing an embodiment of the present disclosure for transferring messages between four applications in a shared memory system.

According to one embodiment of the present disclosure, and without limitation, the proposed method for transferring messages between four applications in a shared memory system is shown in FIG. 4. This method implements the Java Fast Shared Memory Communication protocol. The Java sending method 42 is running in a shared memory computer system 40 with a plurality of processing elements, either homogeneous or heterogeneous (processor cores, FPGAs, GPUs). The sending method 42 is running within a regular/standard JVM 41, and uses a messaging API for invoking the communication mechanism. Efficient Java communication support is obtained through the communication device 44, which implements the communication mechanism of the present disclosure. This mechanism allows the applications to access directly the underlying shared memory. The communication device 44 handles message transfers between applications and the transfer is typically implemented by direct copying of the message (which includes the object to be transferred). In a messaging system running on a single JVM, data copying cannot be avoided since the application relies on the messaging API for data transfer, and therefore the sending method transfers a copy of the object to the receiving method. Thus, each application maintains its own private copy of the data and data access does not need to be synchronized.

Existing mechanisms for exploiting shared memory computer systems with a single JVM, such as MPJ Express v0.36 multi-core device, could also resemble FIG. 4. The divergence between the embodiment of the present disclosure and existing messaging method hinges on the communication device 44 that implements the communication mechanism of the present disclosure. The main difference between both approaches is that existing mechanisms always buffer the data, which is then stored in their communication device, whereas the communication device 44 need only store references to the messages, without buffering of the data. Moreover, existing mechanisms handle two shared structures in their communication device (sending and receiving requests from all the threads), whereas the communication device 44 handles only one structure (a message queue for storing references with incoming messages to the corresponding thread) per thread in the device. The message queue has a fixed number of slots and is handled through two atomic integers, which represent the head and the tail of the queue, thereby achieving a lock-free structure. Thus, the synchronization overhead has been significantly reduced in the Java communication device 44 compared to existing systems due to the use of lock-free structures. Moreover, the message queue does not generally store messages, except for small messages when de-coupling between sending and receiving operations is required. Thus, the queues can handle a high number of incoming messages and reception requests. In the case where a queue runs out of message slots, then a temporal dynamic list is used for storing the incoming messages. Finally, the communication device 44 presents higher scalability than existing approaches thanks to the exploitation of data locality. In fact, each processing element has its own copy of the data and its structures in its closest memory, mainly in its cache hierarchy.

According to the embodiment of the present disclosure shown in FIG. 4 the operation of the proposed method for message transfers on shared memory systems 40 is implemented in the communication device 44, which receives a message transfer request 45 from the sending application 42. If this request matches a previously received message transfer request 46 from the receiving application 43, then the data is directly copied from the source message to the destination message. If the sending request does not match any previously received message transfer request then there are two options: (1) synchronize the sending method with the receiving method and wait for the receiving request containing the message destination address, thereby permitting a single copy operation, or (2) copy the message to an intermediate buffer to avoid synchronizing the sending and receiving methods. The latter approach is generally used for short messages, whose process 47 of being copied to the destination buffer is performed once the matching receiving request 46 has been received by the Java communication device 44. When the communication is synchronous, only one application performs the copy, for efficiency reasons this is the receiving method 43. In this case, the sending method 42 is notified through a control message 48 that the receiving method has finished copying so that the sending method 42 may continue processing. There is only one communication device 44 per shared memory system 40, and it is the only shared reference among the applications 42 and 43. Each application has its own naming space due to the use of custom class-loaders that isolate each application. Therefore, it is possible to have several threads executing several codes in parallel without synchronization or static variables issues, since data is not shared (with the exception of the communication device 44 reference). This behavior is not possible in other languages, such as C. The C language does not allow isolating naming spaces, and shared memory support must be implemented using inter-process communications rather than intra-process transfers between threads.

Figure 5:
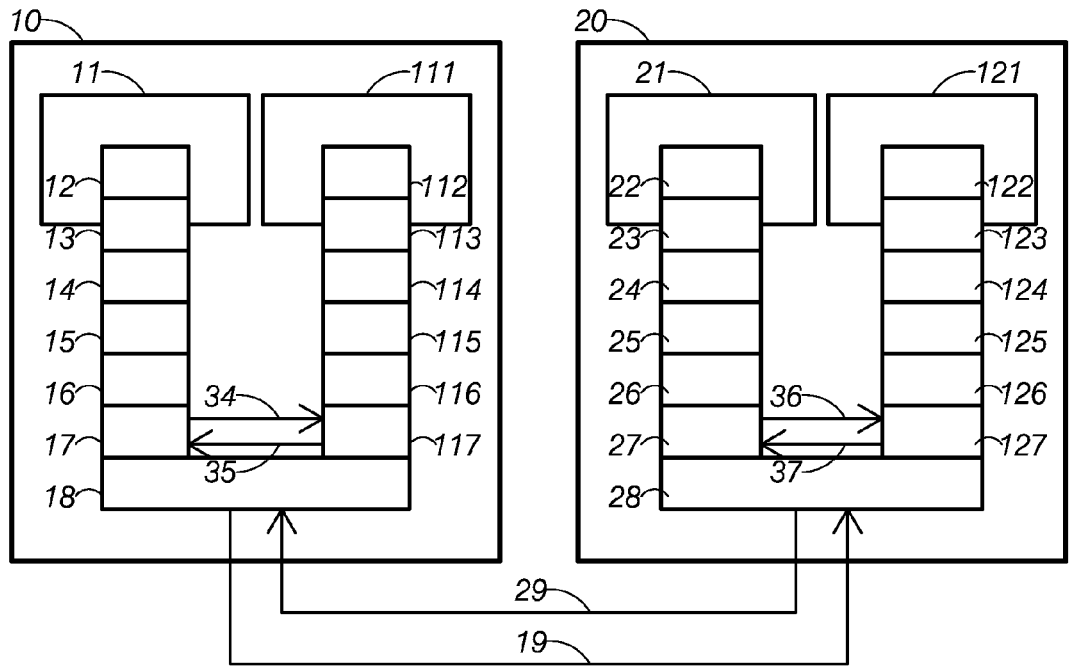
FIG. 5 illustrates a block diagram representing an existing method for transferring messages between four applications in a two-node cluster with two applications per node.

An example of an existing method for transferring messages between four applications in a two-node cluster with two applications per node is shown in FIG. 5. The sending process 12 is running within a JVM 11 on a computer system 10, and uses a messaging API for invoking the communication method. The communication process in this scenario is a combination of the existing communication mechanisms shown in FIG. 1 for inter-node transfers and FIG. 3 for intra-node communication. Thus, if the message destination is an application 112 running in the same computer system 10, but in a different JVM 111, then an intra-node inter-process communication mechanism is used, with message transfers between sending and receiving communication stacks at the loopback device interface. This is represented by network driver layers 17 and 117, with message transfers 34 and 35, with the message transfer 35 used for a control message sent back to the sending method 12. In the case where the destination is an application 22 running within a JVM 21 on a different computer system 20, then an inter-node communication mechanism is used, transferring the message through the sending communication stack 13-18, then through the network 19, and finally through the receiving communication stack 28-23 until the receiving application 22 is reached. If the communication protocol requires sending a control message back to the sending method then the communication stacks are traversed in reverse order, and a network transfer 29 is performed. This communication method has been efficiently implemented in existing non-Java communications (e.g., MPI support on clusters of multi-core processors) that only perform inter-process communication in shared memory when running on hybrid shared/distributed memory architectures. Several relevant optimizations have been proposed for inter-process communication in shared memory in the scenario where the use of threads is not possible due to conflicts in naming spaces and issues when running additional threads. Regarding Java messaging methods, the use of communication network stacks is the only existing solution for communications on clusters of multi-core processors. However, the use of multiple JVMs per computer system can represent an important resource waste, particularly of memory. If an existing Java application wants to take advantage of a single JVM and thread-based shared memory transfers, then it must implement these communications on top of the messaging API, since no existing Java messaging method transparently handles intra-node communication as thread-based shared memory transfer.

Figure 6:
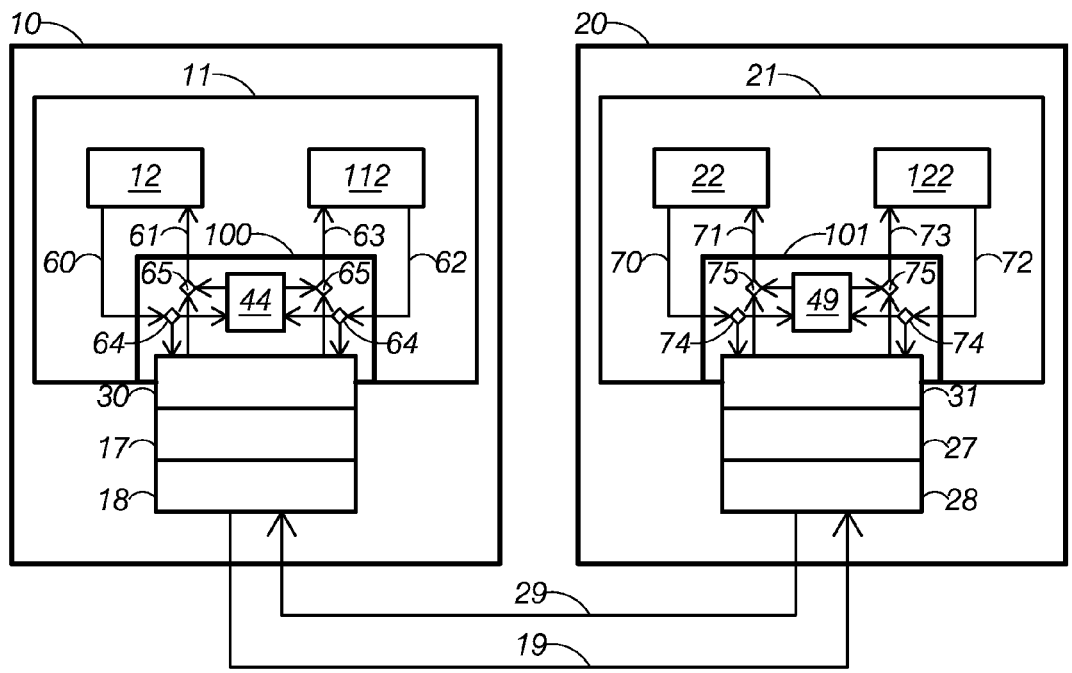
FIG. 6 illustrates a block diagram representing an embodiment of the present disclosure for transferring messages between four applications in a two-node cluster with two applications per node.

According to one embodiment of the present disclosure, and without limitation, the proposed method for transferring messages between four applications in a two-node cluster with two applications per node is shown in FIG. 6. This method implements the Java Fast Hybrid Network/Shared-Memory protocol. A sending application 12, using a messaging API and running within a regular/standard JVM 11 on a computer system 10, communicates with an application 112, also using a messaging API and running within the same JVM 11 on the same computer system 10, through the shared memory communication mechanism (intra-node) of the present disclosure, implemented in the communication device 44. The sending application 12 communicates with applications 22 and 122, running in a remote computer system 20, through the networked communication mechanism (inter-node) of the present disclosure, implemented in the communication device 30. Both communication mechanisms are included in a hybrid shared/distributed memory communication device 100, which handles intra-node and inter-node data transfers transparently to the sending method. This hybrid communication device is not merely a composition of the shared memory and the network communication device, since it has to confront several tasks such as starting the multithreaded environment within a single JVM, identifying the processes running in the local computer system (for delivery of network messages to them), and controlling access to the network communication device, which despite supporting the highest level of thread safety can be handled more efficiently if the message progression is performed by an idle thread. Moreover, the hybrid communication device also implements typical intra-node collective operations, such as broadcast, barrier, scatter and gather, in order to support more efficient collective operations at the cluster level. Moreover, the algorithms implemented in the intra-node collective operations are dynamic, based on non-blocking point-to-point operations, and depend on runtime conditions.

According to the embodiment of the present disclosure shown in FIG. 6, the hybrid shared/distributed memory communication device 101 running on the remote computer system 20, transparently handles message reception 71 for the receiving method 22, in a manner that is independent of the source of the message. The source of the message could be an application 122 running within the same JVM 21 and communicating through the shared memory communication device 49, or it could be the application 12/112 running on a remote computer system 10. Applications 12/122 send data 60/62, respectively, to a message dispatcher 64 (in the hybrid shared/distributed memory communication device 100), which passes data to the shared memory communication device 44 or the network communication device 30. In this case, data transmitted by the network communication device 30 will be received through the network communication device 31. At the receiver side the hybrid shared/distributed memory communication device handles incoming messages to the receiving method 22 through an incoming messages selector 75 that abstracts to the receiving method the specific communication mechanism used. The outgoing message dispatchers are 64 and 74, and the incoming messages selectors are 65 and 75, for computer systems 10 and 20 respectively. FIG. 6 shows the direction of data 60-63 and data 70-73, for computer systems 10 and 20 respectively.

Performance benefits for an embodiment of the present disclosure, using a plurality of interconnection networks and shared memory on a given cluster of computer systems, are illustrated in FIGS. 7-17. It is to be understood that these results, which are examples of the performance gains achievable by an embodiment of the present disclosure, are presented to help characterize and assess the efficiency of the mechanisms of the present disclosure. Moreover, in order to ascertain more clearly the communication overhead of Java messaging methods, the messages consist of byte arrays, which do not incur serialization overhead. However, this is not the most favorable scenario for the embodiment of the present disclosure, since the aforementioned embodiment significantly reduces the serialization overhead compared to existing messaging methods. Therefore, a performance evaluation using messages that need to be serialized would show much higher performance benefits for the aforementioned embodiment compared to existing messaging methods. Nevertheless, the serialization overhead is highly dependent on the object to be transferred, so a message that does not need to be serialized, a byte array, has been used for simplification of the evaluation of Java messaging methods performance. Thus, only the raw communication overhead is measured, without serialization overhead.

Figure 7:
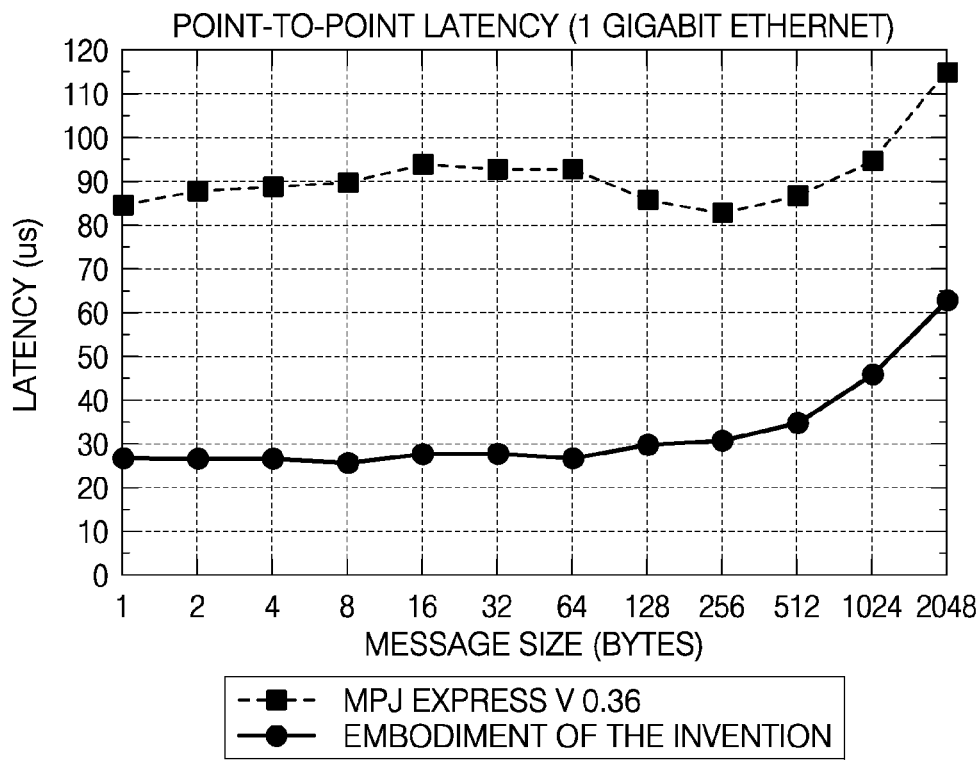
FIG. 7 illustrates a graph representing the performance benefits in terms of point-to-point communication latency obtained by an embodiment of the present disclosure compared to the messaging library MPJ Express v0.36 for short messages transmitted on a 1-Gigabit Ethernet interconnection network.

The performance benefits in terms of point-to-point communication latency, lower is better, obtained by an embodiment of the present disclosure compared to the messaging library MPJ Express v0.36, are shown in FIG. 7. MPJ Express v0.36 is the standard Java messaging library used for HPC, in terms of both performance and user usage. The performance results, indicative of the start-up latency of short messages transmitted over 1-Gigabit Ethernet, show that the embodiment of the present disclosure achieves significantly lower start-up latency than the standard existing messaging library, with a latency reduction ranging from 27 to 85 microseconds.

Figure 8:
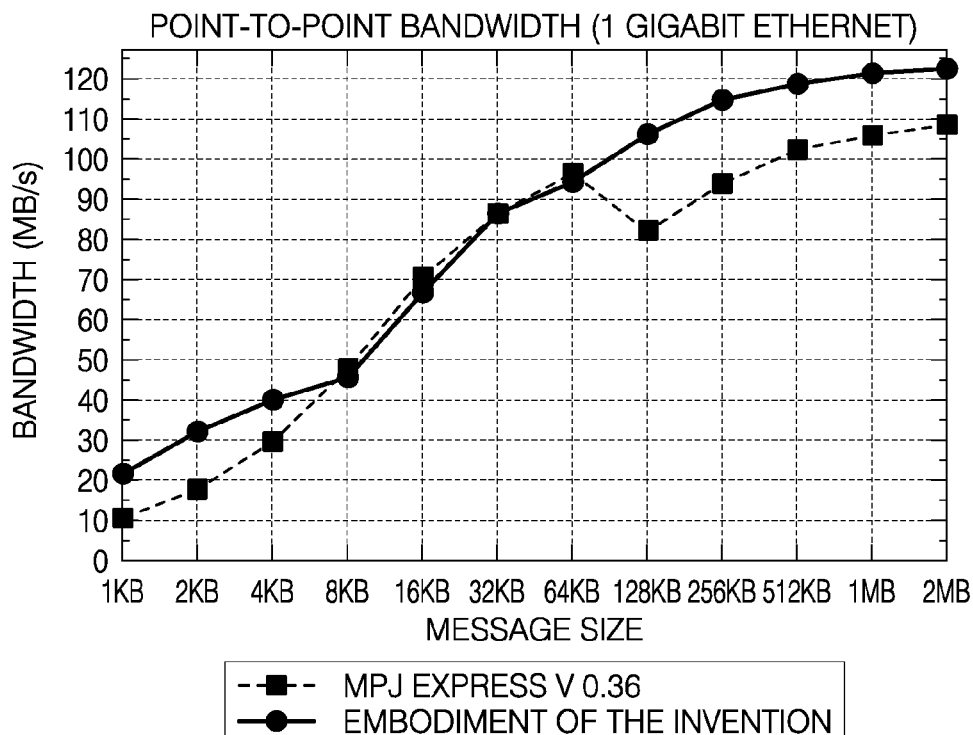
FIG. 8 illustrates a graph representing the performance benefits in terms of point-to-point communication bandwidth obtained by an embodiment of the present disclosure compared to the messaging library MPJ Express v0.36 for long messages transmitted on a 1-Gigabit Ethernet interconnection network.

The performance benefits in terms of point-to-point communication bandwidth, higher is better, obtained by an embodiment of the present disclosure compared to the messaging library MPJ Express v0.36, are shown in FIG. 8. The performance results, indicative of the transfer rate of large messages over 1-Gigabit Ethernet, show that the embodiment of the present disclosure achieves higher overall bandwidth than the standard existing messaging library. This is especially the case for 128 Kbyte transfers, which achieve performance results close to the theoretical maximum bandwidth (125 Mbytes/s) possible for 1-Gigabit Ethernet. In comparison, the MPJ Express v0.36 performance is below 110 Mbytes/s. The performance benefits of the embodiment of the present disclosure are more significant on short message transfers than on long message transfers, since the interconnection technology limits the maximum available bandwidth to 125 Mbytes/s. However, it will be appreciated by those skilled in the art that the processing overhead of the embodiment of the present disclosure is reduced to the extent that Java communications are able to achieve up to 98% of the available 125 Mbytes/s.

Figure 9:
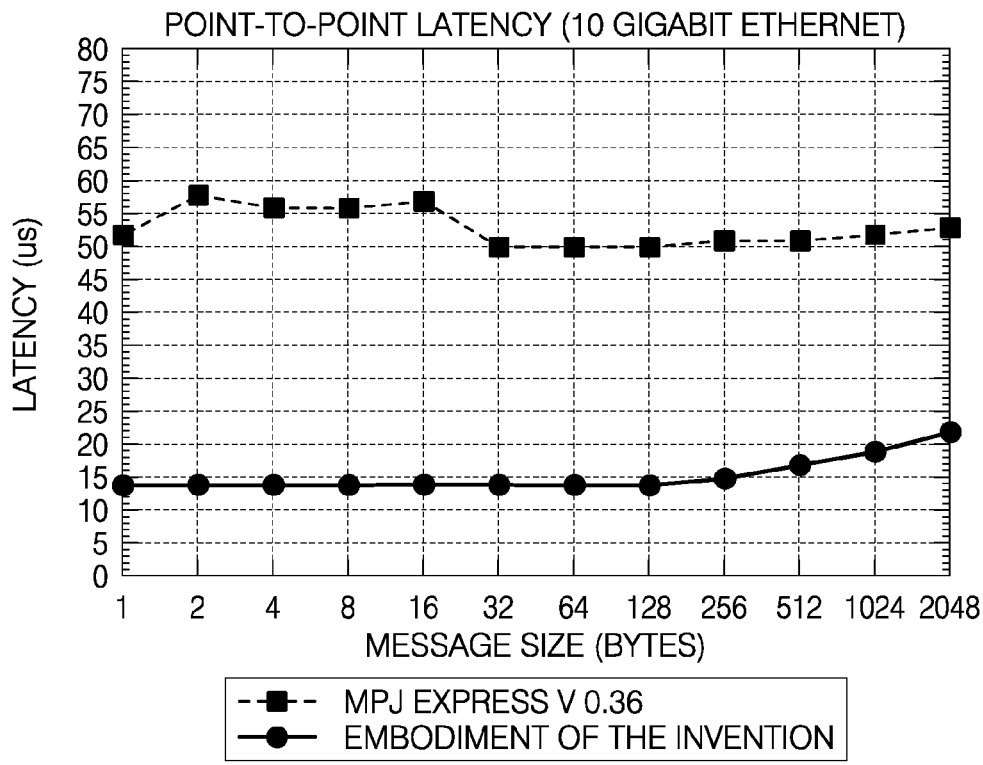
FIG. 9 illustrates a graph representing the performance benefits in terms of point-to-point communication latency obtained by an embodiment of the present disclosure compared to the messaging library MPJ Express v0.36 for short messages transmitted on a 10-Gigabit Ethernet interconnection network.

The performance benefits in terms of point-to-point communication latency, lower is better, obtained by an embodiment of the present disclosure compared to the messaging library MPJ Express v0.36, are shown in FIG. 9. The performance results, indicative of the start-up latency of short messages transmitted over 10-Gigabit Ethernet show that the embodiment of the present disclosure achieves significantly lower start-up latency than the standard existing messaging library, reducing the latency by 14 to 50 microseconds.

Figure 10:
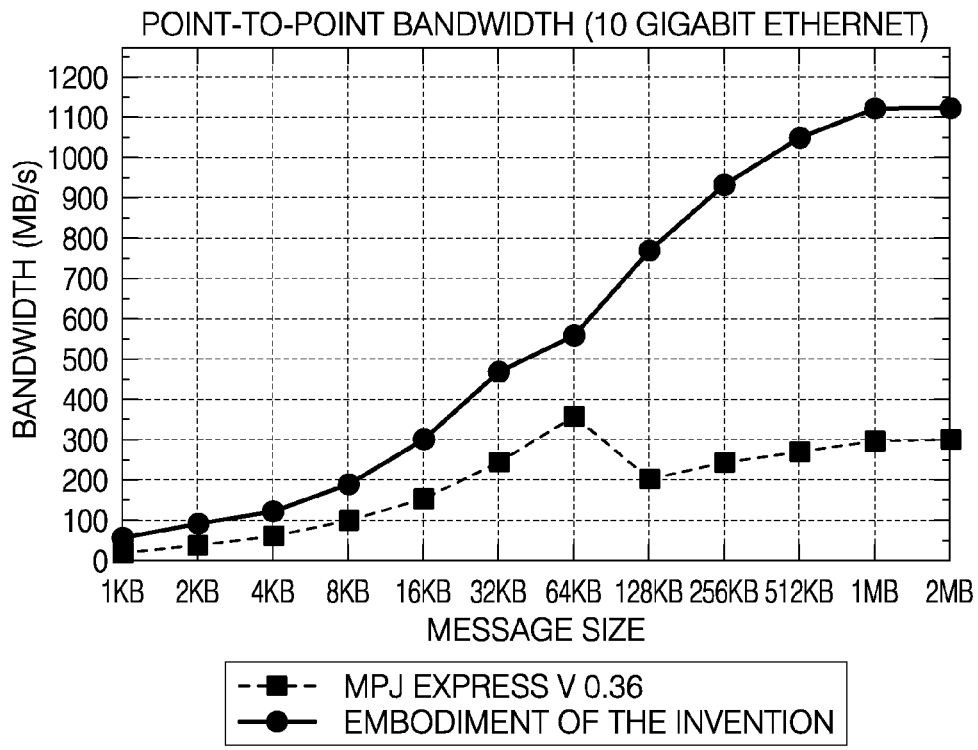
FIG. 10 illustrates a graph representing the performance benefits in terms of point-to-point communication bandwidth obtained by an embodiment of the present disclosure compared to the messaging library MPJ Express v0.36 for long messages transmitted on a 10-Gigabit Ethernet interconnection network.

The performance benefits in terms of point-to-point communication bandwidth, higher is better, obtained by an embodiment of the present disclosure compared to the messaging library MPJ Express v0.36, are shown in FIG. 10. The performance results, indicative of the transfer rate of large messages over 10-Gigabit Ethernet, show that the embodiment of the present disclosure achieves significantly higher bandwidth than the standard existing messaging library. The embodiment of the present disclosure achieves up to 1100 Mbytes/s (8.8 Gbps, 88% of the available network bandwidth), whereas the standard existing solutions only achieves up to 300 Mbytes/s. The efficiency of inter-node message transfers is the primary factor in the superior performance of the embodiment of the present disclosure, with regard to large message transfers, from 128 Kbytes/s. Here both the reductions in data copying and communication processing overhead of the communication mechanism of the present disclosure are key in achieving these results.

Figure 11:
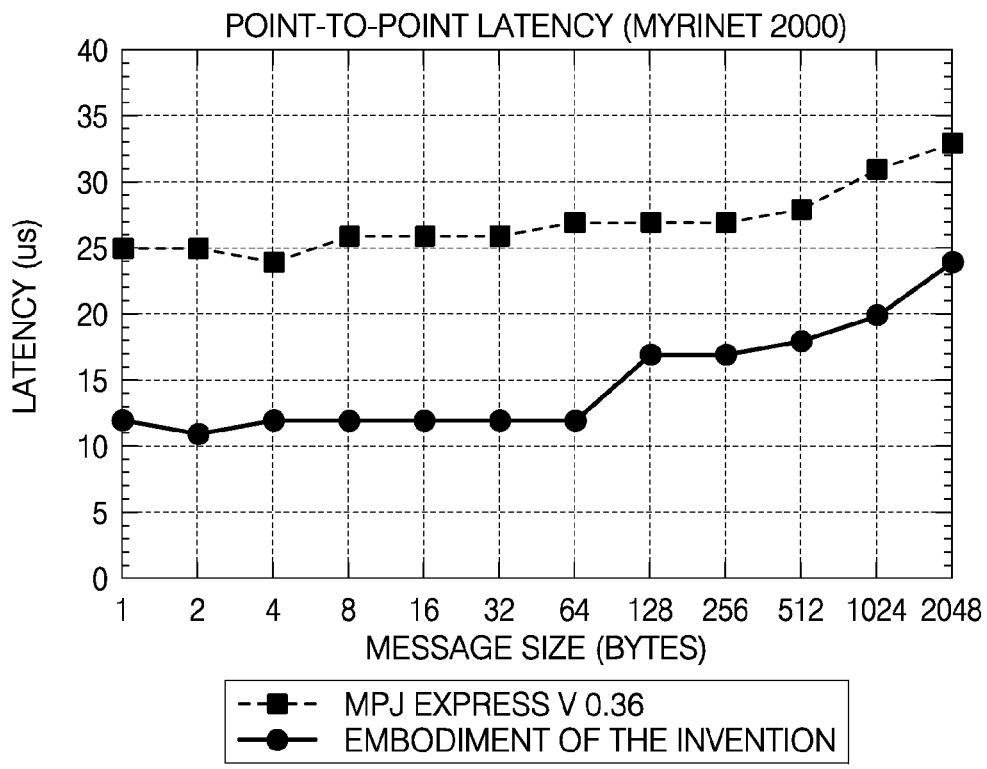
FIG. 11 illustrates a graph representing the performance benefits in terms of point-to-point communication latency obtained by an embodiment of the present disclosure compared to the messaging library MPJ Express v0.36 for short messages transmitted on a Myrinet 2000 interconnection network.

The performance benefits in terms of point-to-point communication latency, lower is better, obtained by an embodiment of the present disclosure compared to the messaging library MPJ Express v0.36, are shown in FIG. 11. The performance results, indicative of the start-up latency of short messages transmitted over Myrinet 2000, show that the embodiment of the present disclosure achieves significantly lower start-up latency than the standard existing messaging library, reducing the latency by 12 to 25 microseconds.

Figure 12:
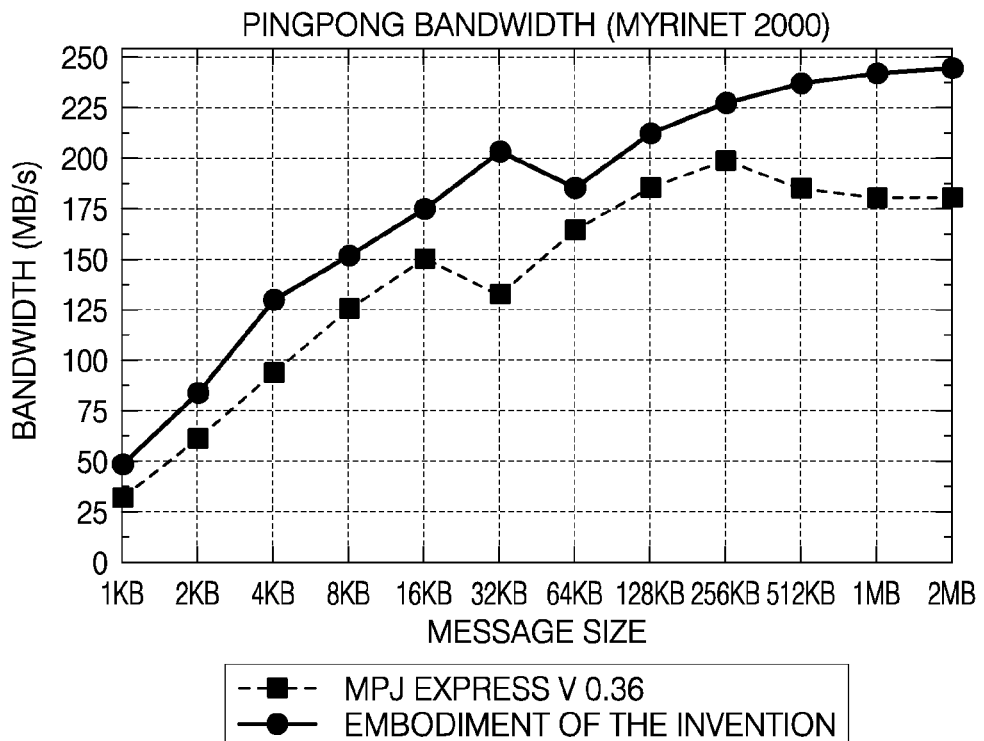
FIG. 12 illustrates a graph representing the performance benefits in terms of point-to-point communication bandwidth obtained by an embodiment of the present disclosure compared to the messaging library MPJ Express v0.36 for long messages transmitted on a Myrinet 2000 interconnection network.

The performance benefits in terms of point-to-point communication bandwidth, higher is better, obtained by an embodiment of the present disclosure compared to the messaging library MPJ Express v0.36, are shown in FIG. 12. The performance results, indicative of the transfer rate of large messages over Myrinet 2000, show that the embodiment of the present disclosure achieves significantly higher bandwidth than the standard existing messaging library. Although the interconnection technology limits the maximum available bandwidth to 250 Mbytes/s, thereby imposing a hard constraint on the performance of the messaging libraries, the embodiment of the present disclosure is able to achieve up to 98% of the available 250 Mbytes/s. In comparison, the standard existing messaging library is only able to achieve up to 80% of the available transfer rate. This means that the embodiment of the present disclosure imposes an overhead as low as 2% on Myrinet 2000 communications, whereas MPJ Express v0.36 imposes greater than 20% overhead.

Figure 13:
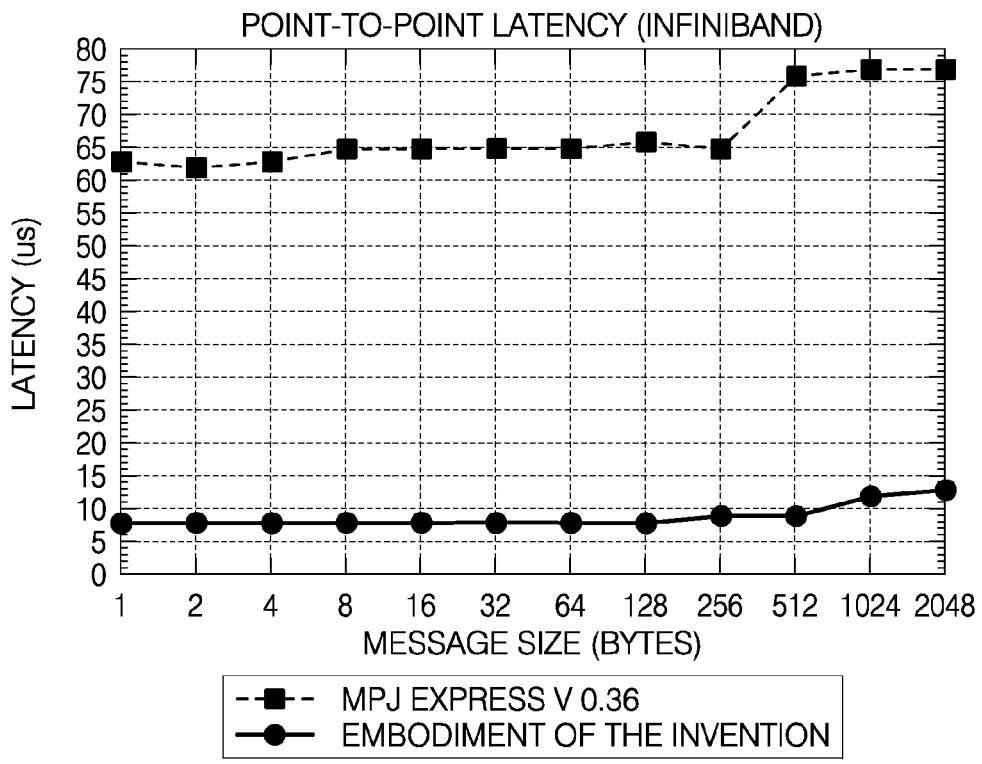
FIG. 13 illustrates a graph representing the performance benefits in terms of point-to-point communication latency obtained by an embodiment of the present disclosure compared to the messaging library MPJ Express v0.36 for short messages transmitted on an InfiniBand interconnection network.

The performance benefits in terms of point-to-point communication latency, lower is better, obtained by an embodiment of the present disclosure compared to the messaging library MPJ Express v0.36, are shown in FIG. 13. The performance results, indicative of the start-up latency of short messages transmitted over InfiniBand, show that the embodiment of the present disclosure achieves significantly lower start-up latency than the standard existing messaging library, reducing the latency by 8 to 63 microseconds.

Figure 14:
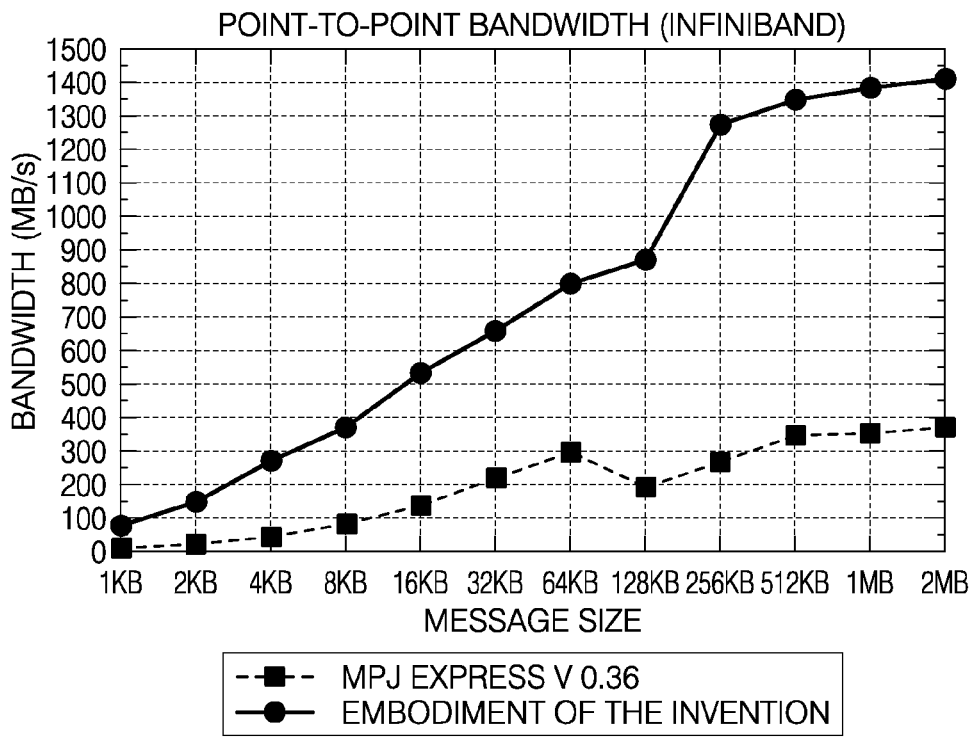
FIG. 14 illustrates a graph representing the performance benefits in terms of point-to-point communication bandwidth obtained by an embodiment of the present disclosure compared to the messaging library MPJ Express v0.36 for long messages transmitted on an InfiniBand interconnection network.

The performance benefits in terms of point-to-point communication bandwidth, higher is better, obtained by an embodiment of the present disclosure compared to the messaging library MPJ Express v0.36, are shown in FIG. 14. The performance results, indicative of the transfer rate of large messages over InfiniBand, show that the embodiment of the present disclosure achieves significantly higher bandwidth than the standard existing messaging library. The embodiment of the present disclosure achieves up to 1400 Mbytes/s, whereas the standard existing solutions only achieves up to 400 Mbytes/s. Moreover, the performance benefits of the embodiment of the present disclosure are significantly higher for all the message sizes: six times higher performance for a 1 Kbyte message, three times higher performance for a 32 Kbyte message, and 3.5 times higher performance for a 2 Mbyte message.

Figure 15:
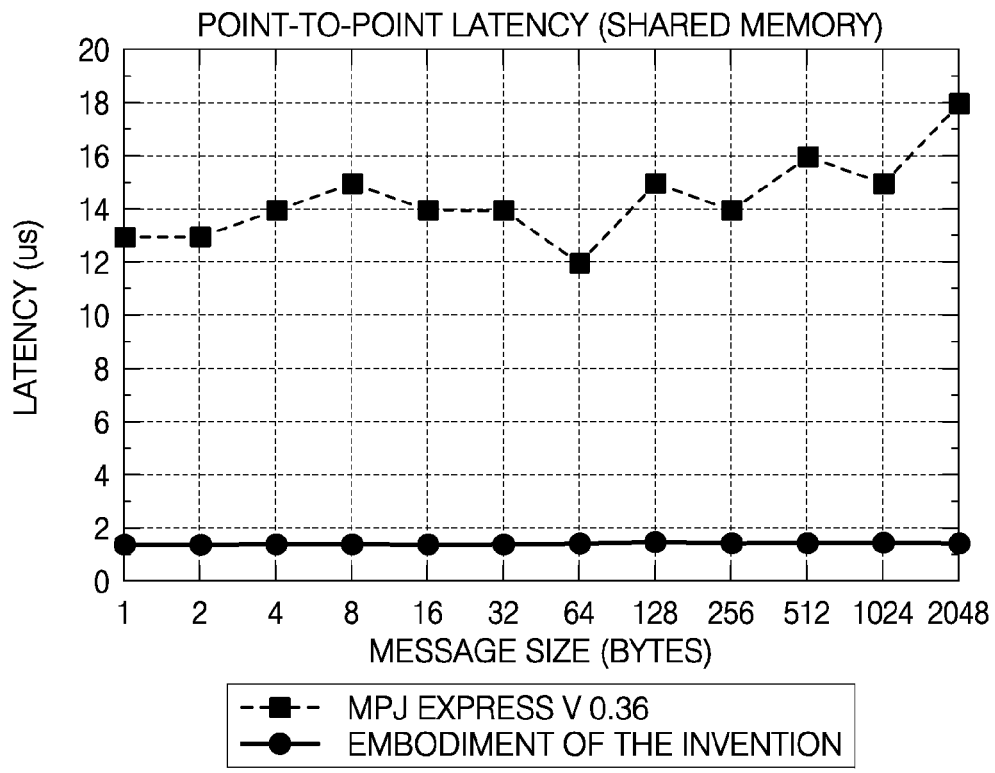
FIG. 15 illustrates a graph representing the performance benefits in terms of point-to-point communication latency obtained by an embodiment of the present disclosure compared to the messaging library MPJ Express v0.36 for short messages in shared memory.

The performance benefits in terms of point-to-point communication latency, lower is better, obtained by an embodiment of the present disclosure compared to the messaging library MPJ Express v0.36, are shown in FIG. 15. The performance results, indicative of the start-up latency of short messages transmitted in shared memory, show that the embodiment of the present disclosure achieves significantly lower start-up latency than the standard existing messaging library, reducing the latency by 1.4 to 13 microseconds.

Figure 16:
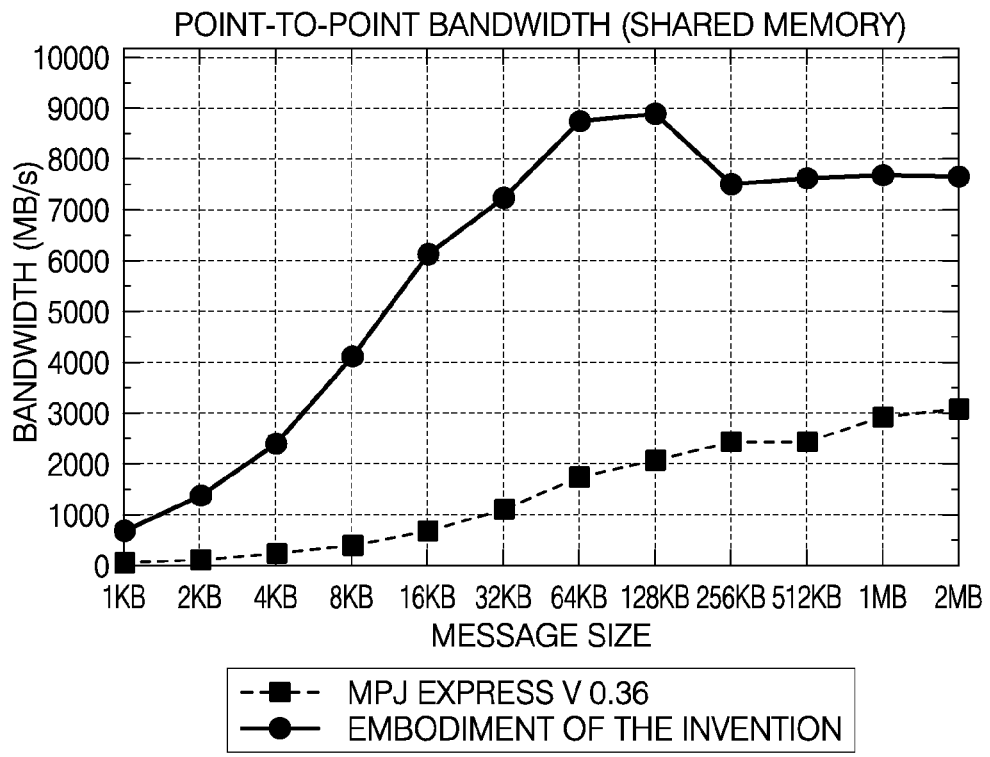
FIG. 16 illustrates a graph representing the performance benefits in terms of point-to-point communication bandwidth obtained by an embodiment of the present disclosure compared to the messaging library MPJ Express v0.36 for long messages in shared memory.

The performance benefits in terms of point-to-point communication bandwidth, higher is better, obtained by an embodiment of the present disclosure compared to the messaging library MPJ Express v0.36, are shown in FIG. 16. The performance results, indicative of the transfer rate of large messages in shared memory, show that the embodiment of the present disclosure achieves significantly higher bandwidth than the standard existing messaging library. The embodiment of the present disclosure achieves up to 9000 Mbyte/s, whereas the standard existing solutions only achieve up to 3000 Mbyte/s. Although both communication mechanisms are based on thread-based intra-process communication, the embodiment of the present disclosure performs a direct copy of the source object to the destination object, avoiding an intermediate data copy. Notably, all existing systems, not only Java messaging systems, make an intermediate data copy (e.g., shared memory UNIX sockets, MPI shared memory optimizations, and SHM).

Figure 17:
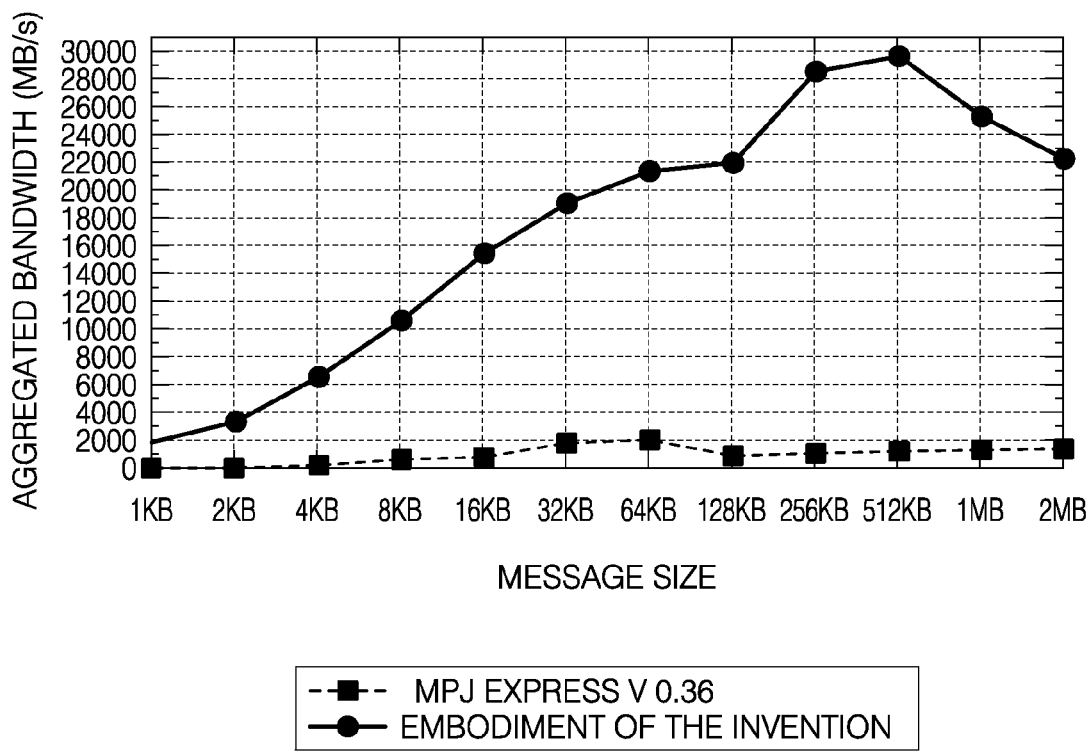
FIG. 17 presents the performance benefits in terms of point-to-point communication bandwidth for a collective broadcast operation performed by an embodiment of the present disclosure compared to the messaging library MPJ Express v0.36 for long messages transmitted on an InfiniBand interconnection network.

The performance benefits in terms of aggregated communication bandwidth, higher is better, for a collective broadcast operation performed on an embodiment of the present disclosure compared to the messaging library MPJ Express v0.36, are shown in FIG. 17. The operation was evaluated on 8 nodes interconnected via InfiniBand with 16 threads per node (128 processes globally), and focused on large message transfers. The test-bed used for measuring the communication performance was a hybrid shared/distributed memory architecture consisting of a cluster of computer systems with multi-core processors. Existing messaging libraries do not support the combination of inter-node network communication with intra-node thread-based transfers. In particular, MPJ Express v0.36 relies exclusively on sockets communications, since it is not possible for MPJ Express v0.36 to take advantage of thread-based data transfers when running on a distributed memory architecture such as a cluster. The thread safety of the communication mechanism of the present disclosure allows the efficient combination of inter-node and intra-node thread-based data transfers without costly synchronizations. Thus, the performance results of the embodiment of the present disclosure are significantly higher than the existing messaging library, achieving up to 30,000 Mbytes/s aggregated bandwidth, whereas MPJ Express v0.36 only achieved up to 2,000 Mbytes/s. The performance benefits obtained on 128 processes running concurrently are around 12 times higher on average, which demonstrates good scalability of the embodiment of the present disclosure. The aforementioned embodiment not only obtains much higher point-to-point communication results, but also significantly higher collective communication performance, achievable through the efficient coupling of inter-node and thread-based intra-node communications in the mechanism of the present disclosure.

While particular embodiments have been described, it is understood that, after learning the teachings contained in this disclosure, modifications and generalizations will be apparent to those skilled in the art without departing from the spirit of the disclosed embodiments. It is noted that the foregoing embodiments and examples have been provided merely for the purpose of explanation and are in no way to be construed as limiting. While the methods and middleware have been described with reference to various embodiments, it is understood that the words that have been used herein are words of description and illustration, rather than words of limitation. Further, although the methods have been described herein with reference to particular means, materials and embodiments, the actual embodiments are not intended to be limited to the particulars disclosed herein; rather, the system extends to all functionally equivalent structures, methods and uses, such as are within the scope of the appended claims. Those skilled in the art, having the benefit of the teachings of this specification, may effect numerous modifications thereto and changes may be made without departing from the scope and spirit of the disclosed embodiments in its aspects.

The invention claimed is:

1. A method for Java messaging implemented in a processing system with one or more processors and with one or more cores per processor, said method for Java messaging comprising transmitting through a high-speed network an object from a sender method to a receiver method using a protocol wherein said sender method is invoked by passing an identifier of said object and an identifier of a transmission endpoint as arguments into said sender method, and wherein drivers for said high-speed network are selected from the group consisting of OFED, InfiniBand Verbs, uDAPL, Myrinet Express, Open-MX, and MPI communications support.

2. The method for Java messaging of claim 1, wherein said protocol implements lightweight object marshaling with neither serialization nor deserialization of object data that is contiguous in Java memory.

3. The method for Java messaging of claim 2, wherein said protocol copies said object to a message queue, whereby synchronization overhead between said sender and said receiver methods is avoided.

4. The method for Java messaging of claim 3, wherein said protocol implements direct access to said object by native high-speed network drivers and shared-memory, whereby the use and overhead of a TCP/IP protocol stack is avoided.

5. The method for Java messaging of claim 4, wherein said protocol transmits said object via one or more cluster interconnection networks using one or more high-speed network switches.

6. The method for Java messaging of claim 5, wherein said native high-speed network drivers are selected from the group consisting of OFED, InfiniBand Verbs, uDAPL, Myrinet Express, Open-MX, and MPI communications support.

7. The method for Java messaging of claim 6, wherein said high-speed network switches are selected from the group consisting of InfiniBand switches, Myrinet switches, Gigabit Ethernet switches, and combinations thereof; and said method for Java messaging comprises transmitting an object from a sender method to a receiver method using a protocol based on a Java Fast Network Communication protocol.

8. A method for Java messaging implemented in a processing system with one or more processors and with one or more cores per processor, said method for Java messaging comprising transmitting through a high-speed network an object from a sender method to a receiver method using a protocol wherein said sender method is invoked by passing an identifier of said object and an identifier of a transmission endpoint as arguments into said sender method wherein drivers for said high-speed network are selected from the group consisting of OFED, InfiniBand Verbs, uDAPL, Myrinet Express, Open-MX, and MPI communications support, and said protocol implements lightweight object marshaling with neither serialization nor deserialization of object data that is contiguous in Java memory, and said protocol is adapted for shared memory.

9. The method for Java messaging of claim 8, wherein said protocol copies said object to a message queue, whereby synchronization overhead between said sender and said receiver methods is avoided.

10. The method for Java messaging of claim 9, wherein said protocol transmits messages within a shared memory system using one or more data copies based on a Java Fast Shared-Memory Communication protocol.

11. The method for Java messaging of claim 10, wherein said data copies are implemented using an intra-process multithreaded transmission within a single standard Java Virtual Machine and each of said sender and said receiver methods is executed in an isolated naming space within said standard Java Virtual Machine.

12. The method for Java messaging of claim 11, wherein said data copies are implemented using an inter-process shared-memory transmission between two standard Java Virtual Machines.

13. A method for Java messaging implemented in a processing system with one or more processors and with one or more cores per processor, said method for Java messaging comprising transmitting through a high-speed network an object from a sender method to a receiver method using a protocol wherein said sender method is invoked by passing an identifier of said object and an identifier of a transmission endpoint as arguments into said sender method wherein drivers for said high-speed network are selected from the group consisting of OFED, InfiniBand Verbs, uDAPL, Myrinet Express, Open-MX, and MPI communications support, and said protocol implements lightweight object marshaling with neither serialization nor deserialization of object data that is contiguous in Java memory, and said protocol is adapted for hybrid network/share-memory.

14. The method for Java messaging of claim 13, wherein said protocol copies said object to a message queue, whereby synchronization overhead between said sender and said receiver methods is avoided.

15. The method for Java messaging of claim 14, wherein said protocol transmits messages using a Java Fast Shared-Memory Communication protocol if said receiver method is invoked on the same computer system as said sender method, and transmits messages using a Java Fast Network Communication protocol if said receiver method is invoked on a different computer system to said sender method.

16. The method for Java messaging of claim 15, wherein said sender method can transmit messages to any communication endpoint on the same computer system or on a different computer system within said processing system, and said method for Java messaging comprises transmitting an object from a sender method to a receiver method using a protocol based on a Java Fast Hybrid Network/Shared-Memory protocol.

17. An apparatus for Java messaging comprising a processor configured to execute a method for Java messaging, said method comprising transmitting through a high-speed network an object from a sender method to a receiver method using a protocol wherein said sender method is invoked by passing an identifier of said object and an identifier of a transmission endpoint as arguments into said sender method wherein drivers for said high-speed network are selected from the group consisting of OFED, InfiniBand Verbs, uDAPL, Myrinet Express, Open-MX, and MPI communications support, and wherein said protocol 1) implements lightweight object marshaling with neither serialization nor deserialization of object data that is contiguous in Java memory, 2) copies said object to a message queue, whereby synchronization overhead between said sender and said receiver methods is avoided, 3) implements direct access to said object by native high-speed network drivers and shared-memory, whereby the use and overhead of a TCP/IP protocol stack is avoided, and 4) transmits said object via one or more cluster interconnection networks using one or more high-speed network switches.

* * * * *